March 31, 1942. G. T. MARKEY 2,278,205
INCUBATOR
Filed Dec. 28, 1939 2 Sheets-Sheet 1

INVENTOR
GEORGE T. MARKEY
BY *A.S.Krob*
ATTORNEY

March 31, 1942.  G. T. MARKEY  2,278,205
INCUBATOR
Filed Dec. 28, 1939  2 Sheets-Sheet 2

INVENTOR
GEORGE T. MARKEY
BY
ATTORNEY.

Patented Mar. 31, 1942

2,278,205

UNITED STATES PATENT OFFICE 2,278,205

INCUBATOR

George T. Markey, Fort Atkinson, Wis., assignor to James Manufacturing Company, Fort Atkinson, Wis., a company of Wisconsin Application December 28, 1939, Serial No. 311,276

8 Claims. (Cl. 119—37)

The present invention relates to small incubators for use on farms or for use by back-yard poultrymen.

The principal object of the present invention is to provide a small incubator which will be as efficient as larger devices of the class.

Another object of the present invention is to place all of the controls on the front of the cabinet so the cabinets may be stacked one on another or sidewise against each other. Thus a small hatching program may be provided with small settings of eggs at spaced intervals.

A further object of the present invention is to provide an incubator which is easily understood and conveniently handled by unskilled help such as may be found on some small farms and back-yard poultry farms.

To these and other useful ends, my invention consists of parts, combinations of parts, or their equivalents, and mode of operation, as hereinafter set forth and claimed and shown in the accompanying drawings in which:

Figure 1:
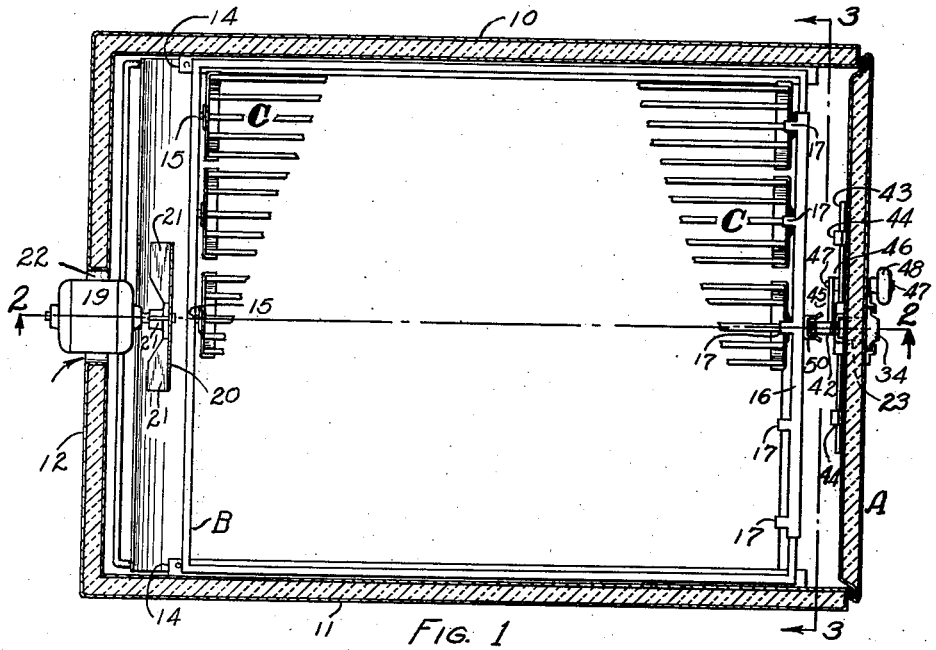
Fig. 1 is a horizontal sectional view of my improved device taken on lines 1—1 of Figure 2.

As thus illustrated, my improved incubator comprises insulated side walls 10 and 11 and an insulated rear wall 12. An insulated front wall 13 is provided having an opening for an insulated door which, in its entirety, is designated by reference character A.

I have illustrated an incubator having preferably three trays which in their entirety are designated by reference character B. Trays B are supported on strips 14 so they may be removed or replaced drawer-like when door A is open. These trays are each preferably provided, as illustrated, with five egg holding cages which may be similar to the cage illustrated in my patent No. 1,796,872, March 17, 1931.

The cages are designated in their entirety by reference character C and are, as is the custom, hingedly mounted in trays B as at 15. Insofar as the present invention is concerned, any style of tray or cage may be used. The assembly differs from the conventional cages and trays in that the means for rocking the cages is on the door end of the tray (see Figures 1 and 2). This means comprises a member 16 which slidably fits over the front end member of the tray and having rearwardly projecting prongs 17, one for each cage, which are engaged by slots 18 formed in the top of the end members of cages C. Thus when member 16 is oscillated, the cages will be rocked back and forth. This movement of the cages is accomplished from the front of the cabinet as will hereinafter appear.

Figure 2:
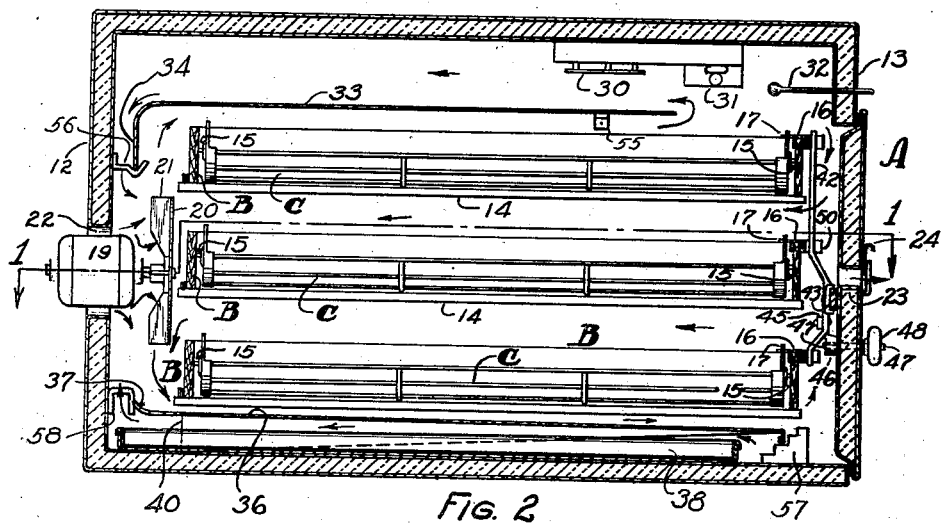
Fig. 2 is a vertical section of the device shown in Figure 1 taken on line 2—2 of this figure.

I provide a motor 19 having a disc 20 secured to the front end of its shaft as illustrated in Figures 1 and 2. Disc 20 is provided with a number of fan blades 21. Motor 19 is positioned concentrically in opening 22, the opening being slightly larger than the diameter of the motor. Thus a small volume of air will be drawn into the cabinet through the annular space thus formed, the entering air acting to cool the motor. In other words, the motor will act to preheat the entering outside air.

A quantity of air is discharged from the cabinet through outlet 23 positioned preferably in door A as illustrated in Figure 2. A suitable gate valve 24 may be used to regulate the size of this outlet. Thus whatever air is permitted to be discharged by the position of valve 24, an equal volume will pass into the cabinet through annular space 22.

In devices of the class, it is necessary to heat the recirculated air to a temperature suitable for incubating and hatching. For the purpose, I provide an electric resister 30 having a thermally controlled switch 31.

I provide a thermometer 32, the stem protruding through member 13 whereby the operator may view the temperature of the circulating air without opening the door.

The fan motor is adapted to move air into, through and out of the cabinet as illustrated by arrows. Partition 33 having a flange 34 and partition 36 having a flange 37 act to form an air passageway adjacent the top, bottom and rear walls of the cabinet.

I provide a water pan 38 in the bottom of the cabinet having a suitable tube connection (not shown) whereby the desired quantity of water may be maintained in the pan or the pan may be pulled out drawer like far enough so water may be added as needed.

Figure 5:
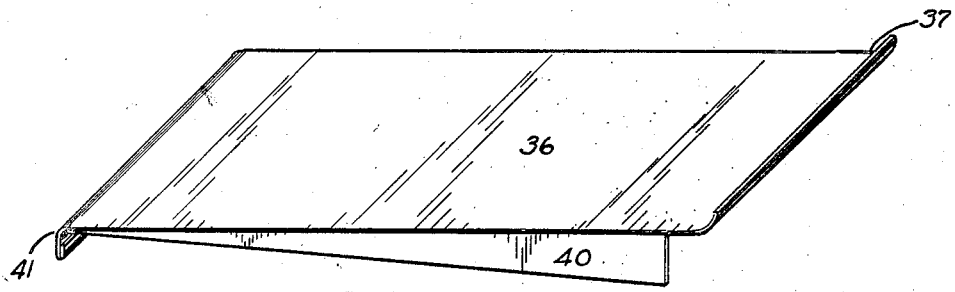
Fig. 5 is a perspective view of the air directing plate positioned over the water pan.

Member 36 is provided with side flanges 40—40 the rear end being wide enough to support this member on the bottom of the cabinet in the position shown. Members 40 taper upwardly toward the front end of member 36 as illustrated by dotted lines in Figure 2 and by full lines in Figure 5, the front end being adjustable vertically by means hereinafter described, whereby more or less of the air may be diverted over the water in the pan. For example, the free end 41 of member 36 may be dropped down so it lies on the pan at its front end and thus practically no air will pass over the water in the pan, all of the air being forced to pass between member 36 and the bottom tray. However, if the free end of member 36 is raised, then some of the air will be caused to travel under this member and over the water in the pan. Thus by moving the free end of member 36 up or down, the humidity of the air in the cabinet may be controlled.

Figure 4:
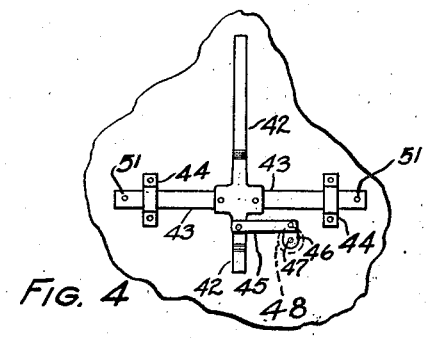
Fig. 4 is a detail view of the cage rocking device as viewed from the rear side of the door.

Referring now specifically to Figures 1, 2 and 4, I slidably mount a vertically positioned bar 42 on the inner surface of the door by means of a bar 43 and brackets 44—44. A link 45 is pivotally connected to member 42 and to a crank 46, the crank being secured to a shaft 47 which extends through door A and having secured thereto at its outer end, a knob 48. Thus by grasping the knob 48, member 42 may be moved to the right or left and caused to rock the cages as follows:

Brackets 50 are secured to members 16 and adapted to loosely embrace member 42 when the door is shut (see Figure 1). Thus when knob 48 is turned one way or the other, member 42 will cause members 16 to oscillate and rock the cages accordingly.

It will be seen that once or twice a day the operator may turn the knob to the right or left thus to shift the cages as is the custom in incubators of the class.

In Figure 4 I illustrate pins 51 which contact members 44 when the cages are in their proper angled position.

Thus it will be seen that when the door is opened, member 42 will be disengaged from members 50 and that the trays may then be removed and replaced drawer like. It will also be seen that when the upper tray is removed, member 33 may be removed drawer like. Members 33 and 36 are suitably mounted for this purpose. Thus the cabinet may be easily emptied of trays and other parts and cleaned and disinfected and the mechanism is such as will make it possible to handle the eggs as easily as they are handled in large incubators and that the thermal electric heating system and means for humidifying the air will operate as efficiently in maintaining the proper condition of the circulating air as in a large incubator.

Figure 3:
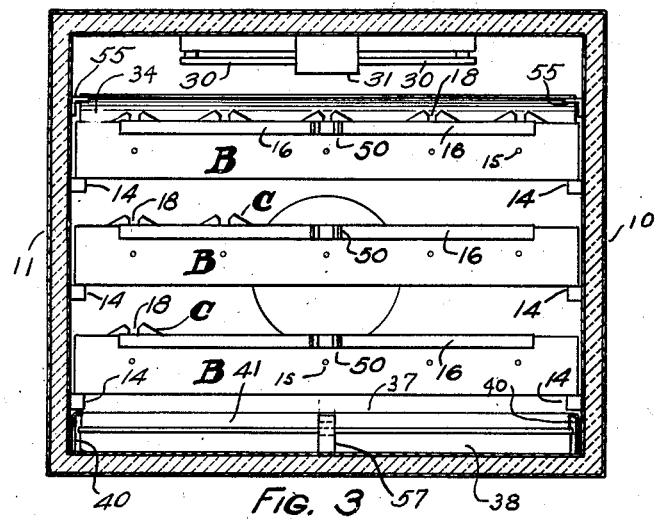
Fig. 3 is a transverse sectional view of the device shown in Figures 1 and 2 taken on line 3—3 of Figure 1.

By referring to Figures 2 and 3, it will be noted that I have provided front supporting brackets 55—55 for member 33 and spaced rear supporting brackets 56 (one not shown), the rear brackets being secured to the rear panel of the cabinet and arranged to embrace the lower end of member 34 so as to determine the longitudinal position of member 33. It will also be noted that I have provided preferably a notched block 57 with which to determine the vertical position of member 41. A short narrow bracket 58 is secured to the rear panel of the cabinet and is provided with a projection long enough to determine the distance between member 37 and the rear panel of the cabinet. Thus member 41 may be lowered so the front end of member 36 will lie on the top of the pan; thus to prevent air from passing in contact with the water. Member 57 may also be moved so as to raise the front end of member 36 to its highest position so that practically all of the circulating air will pass under member 36 and over the water in the pan.

By scrutinizing Figure 2, it will be seen that the fan acts to cause a directional air movement within the cabinet as indicated by arrows. That is, air will be moved toward the fan in the center of the cabinet and outwardly and away from the fan on the inner sides of members 33 and 36; that some of the air will be moved rearwardly over member 33 and under member 36 thus some of the recirculated air passes the resister and thermally controlled switch; that some of the air will pass under member 36 and over the water in pan 38 and then in rear of member 37 and that the incoming outside air will be warmed and caused to join the recirculating air.

Having thus shown and described my invention, I claim:

1. An incubator of the class described, comprising a cabinet having a door in its front end, a number of egg trays positioned in vertical spaced relation in said cabinet and being removable and replaceable drawer-like when said door is open, egg cages hingedly mounted on the front and rear walls of said trays, means on the front walls of said trays adapted to be oscillated and thereby rock said cages, means on said door adapted to engage said last means when the door is closed, means on the exterior of said door and having an operating connection to said last means whereby said cages may be rocked back and forth manually when said door is closed, and a motor positioned in an opening in the rear panel of said cabinet having a fan operatively connected thereto adapted to circulate the air in said cabinet.

2. A device as recited in claim 1 including; said first means comprising a vertical bar transversely slidably mounted on said door.

3. A device as recited in claim 1 including; said opening being somewhat larger than the motor to thereby form an annular air inlet passageway, and an air outlet in said cabinet positioned a distance from said motor whereby a quantity of outside air will be drawn into said cabinet and an equal quantity of recirculated air is discharged through said outlet.

4. An incubator of the class described, comprising a cabinet having a front door, a motor positioned in an opening in the rear panel of said cabinet and having a fan operatively connected at the inner end thereof, a number of trays having egg cages and being spaced vertically and slidably mounted on the side walls of said cabinet and being removable drawer-like when said door is opened, brackets mounted on the front ends of said trays and adapted to rock said cages when oscillated, and means on said door adapted to operatively engage said brackets when said door is closed, said last means having an operating connection which extends through said door and having means whereby the cages may be rocked from the exterior.

5. An incubator of the class described, comprising a cabinet having a front door, a number of vertically spaced trays slidably mounted on the side walls of said cabinet and being removable drawer-like when said door is open, a number of egg cages rotatably mounted in said trays, means for heating, humidifying and circulating air between said trays, means slidably mounted on the forward ends of said trays adapted to rock the cages therein and means on said door adapted to operatively engage said last means when said door is closed, and means on the exterior of said door having a connection extending through said door and an operating connection to said cage rocking means whereby the cages may be rocked from the exterior when said door is closed.

6. An incubator of the class described, comprising a cabinet having a number of vertically spaced trays, a door in the front of said cabinet and means whereby when the door is open, said trays may be removed and replaced drawer like, a fan motor mounted in the rear panel of said cabinet and having a fan secured to the inner end of its shaft, and plates positioned between the top and bottom trays and the top and bottom walls of said cabinet and having inturned flanges on their rear ends, said plates and inturned flanges being positioned whereby a part of the circulated air is moved forward and then moved outwardly and rearwardly between said plates and the cabinet walls and then inwardly to said fan.

7. A device as recited in claim 6 including; a water pan positioned on the floor of said cabinet and means on said bottom plate whereby the forward end may be raised and lowered to thereby cause more or less air to impinge the water in said pan.

8. An incubator of the class described, comprising a cabinet, a number of vertically spaced trays slidably mounted on the side walls of said cabinet, a front door in said cabinet providing means whereby said trays may be removed and replaced drawer-like when the door is open, means in said cabinet adapted to circulate and heat the air therein, a water pan positioned on the bottom of said cabinet and in the path of the circulating air, and a plate, one end being rockingly mounted a short distance above said pan, the other end having adjusting means thereby to cause more or less circulating air to impinge the water in said pan.

GEORGE T. MARKEY.